Jan. 7, 1958 E. W. BARNES ET AL 2,818,712
SLIPPING CLUTCH

Filed Nov. 8, 1954 2 Sheets-Sheet 1

Inventors:
Edwin W. Barnes,
Albert L. Hardy,
by
Their Attorney.

Jan. 7, 1958 E. W. BARNES ET AL 2,818,712
SLIPPING CLUTCH

Filed Nov. 8, 1954 2 Sheets-Sheet 2

Inventors:
Edwin W. Barnes,
Albert L. Hardy,
by *Their Attorney.*

United States Patent Office 2,818,712
Patented Jan. 7, 1958

---

2,818,712

SLIPPING CLUTCH

Edwin W. Barnes, Baltimore, Md., and Albert L. Hardy, Schenectady, N. Y., assignors to General Electric Company, a corporation of New York Application November 8, 1954, Serial No. 467,323

11 Claims. (Cl. 64—29)

---

This invention relates to a slipping clutch which will slip upon reaching a predetermined torque.

The slipping clutch of this invention is particularly useful in systems of the type disclosed in copending application Serial No. 401,254, Slipping Clutch, of Howard I. Becker, filed December 30, 1953, and assigned to the assignee of the present invention, wherein a reversible motor or prime mover drives a load through a clutch, and wherein the load driven by the output shaft of the clutch frequently encounters a mechanical stop. One such system is a servo search system wherein the clutch drives a reversibly rotatable antenna. It has been customary in the past in such systems to use ordinary friction clutches for transmitting torque between the motor or prime mover and the load. However, when the load encounters a mechanical stop, considerable slippage of the clutch usually occurs before the direction of the motor is reversed. Such slippage of the ordinarily used friction clutch is accompanied by considerable scoring and mechanical wear between the torque transmitting members of the clutch. Another undesirable feature of this slippage is the large amount of heat generated between the clutch members. Thus, as a consequence of this slippage, the clutch will soon become overheated and scored so that the torque will increase considerably, and the motor itself will be damaged or overheated. It is, therefore, an important object of this invention to overcome the problems thus outlined by providing a clutch which will slip with a minimum amount of heat generated and little or no mechanical wear between the torque transmitting members, and which is not affected by changes in the coefficient of friction.

Additional objects of the invention are to provide:

A pre-loaded slipping clutch which will start to slip at a predetermined torque, and which while slipping will generate a minimum amount of heat and have little or no mechanical wear;

Such a pre-loaded slipping clutch having the desired transmitting and slipping characteristics in both directions of rotation;

A slipping clutch suited for use between a prime mover and a load and adapted to prevent material damage to the prime mover or to the clutch when the load encounters mechanical stops;

A clutch adapted to transmit a predetermined torque which will slip with a minimum amount of friction after the predetermined torque is exceeded;

A clutch of the type described above which will maintain the orientation of the driving member and the driven member in a predetermined relationship.

Briefly stated in accordance with one aspect of the invention, a slipping clutch is provided wherein the clutch members have opposed faces with wavelike contours thereon.

Guided rollers are supported between these faces and are adapted to contact the faces. Means are provided for applying a predetermined force to at least one of the members to urge it and the rollers toward the other member. Thus, at a predetermined torque transmitted between the clutch members, the force of the rollers acting to separate the members will become greater than the predetermined force applied and the rollers will roll on the faces permitting the clutch to slip. Another aspect of the invention includes means for maintaining the orientation of the clutch members and the guided roller support in a predetermined relationship in spite of creepage between the members.

The invention will be better understood from the following description together with the accompanying drawing, and its scope will be pointed out in the appended claims.

Figure 1:
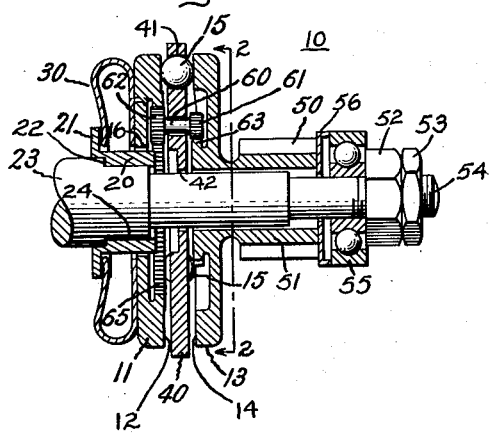
Fig. 1 is a sectional view illustrating an embodiment of the invention.
Figure 2:
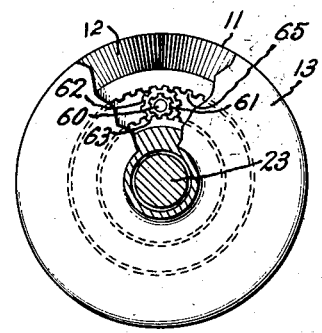
Fig. 2 is a view taken along line 2—2 of Fig. 1 partly broken away and omitting the guided roller support for purposes of clarity.

Referring more particularly to the drawing, in Fig. 1 there is provided a slipping clutch 10 illustrating one embodiment of this invention. A disk-shaped driving member 11 is provided having a face 12 with wavelike contours thereon. A driven member 13 is provided and also has a face 14 with wavelike contours thereon similar to the contours on the face of the driving member 11. A plurality of guided rollers 15, shown as ball bearings, are disposed between the faces of the clutch members 11 and 13, and are adapted to roll on these faces.

One of the clutch members of this invention is arranged to be axially movable in either direction. In the illustrated embodiment this member is the driving member 11 which is in the form of an annular disk having a central bore 16 adapting it for sliding on the hub portion 20 of a spring retainer 21. The spring retainer 21 seats against shoulders 22 on the main drive shaft 23 and is prevented from rotating on this shaft by a flat portion 24 cooperating with a similar flat portion on the shaft.

Figure 3:
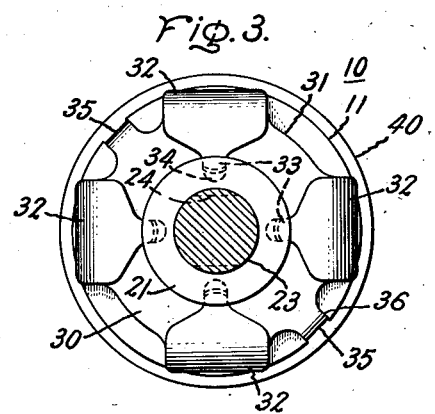
Fig. 3 is an end view looking from the spring side of the clutch of Fig. 1.

The slipping clutch of this invention is pre-loaded in the sense that means are provided for applying a predetermined force for urging one of the clutch members and the rollers toward the other member to maintain the rollers in contact with the faces of the clutch members. In the illustrated embodiment of the invention this means is in the form of a spring 30 cooperating with both the spring retainer 21 and the driving member 11. This spring 30 as may be seen in Figs. 1, 3 and 6 comprises a disk portion 31 having U-shaped spring fingers 32 extending outwardly therefrom. Projections 33 of the fingers 32 fit within slots 34 cut in the spring retainer 21. A pair of axially extending projections 35 extend from the disk portion 31 of the spring in the opposite direction from that of the spring fingers 32. These axial projections 35 fit within slots 36 cut in the driving member 11. Thus, it will be seen that the driving shaft 23, when rotated by a motor or other prime mover, carries with it as a unit the spring retainer 21, the spring 30, and the driving member 11.

The rollers 15, which are three in number in the illustrated embodiment, are carried by a cage 40 having bores 41 therein to guide the rollers. This cage 40 is in the form of an annular disk having a central bore 42 of appropriate size to insure that the cage will be freely rotatable about the supporting portion of the driving shaft 23.

The driven member 13 of the clutch is adapted for driving a load, the illustrated means for accomplishing this function being in the form of an integral pinion 50 formed on the driven member. The hub portion 51 of the driven member has a central bore therethrough of such diameter that it is freely rotatable about the portion of the main drive shaft 23.

Adjustable stop means are provided for preventing axial movement of the driven member in the direction away from the guided rollers. This means in the illustrated embodiment is in the form of take-up nuts 52 and 53 which cooperate with the threaded portion of a shaft extension 54 to limit axial movement of the driven member 13. A ball thrust bearing 55 having a spacer 56 between it and the pinion 50 surrounds the shaft extension 54 and serves to take up axial thrust upon rotation of the driven member. The initial torque setting of the clutch may thus be adjusted by rotating the nuts 52 and 53 to vary the force with which the spring 30 acts against the clutch members.

The wavelike contours on the faces of the clutch members are provided to hold the plates relatively fixed with respect to each other below the breakaway torque, that is, the predetermined torque setting of the clutch. It is desirable for the purpose of eliminating impact that these contours provide a continuous path for the rollers during slipping, and also that there is no acceleration of the axially movable clutch member which will result in loss of contact between the rollers and the faces. It has been found that contours following a sinusoidal waveform are satisfactory for the purposes of this invention and also are relatively simple in manufacture. It will be understood, however, that in some instances variations from a purely sinusoidal contour are desirable and it is intended that such variations are within the scope of the invention.

In the illustrated embodiment there are three rollers shown and correspondingly three complete cycles per face, that is, three sets of hills and valleys. This small number of rollers and cycles is preferred in order that the frequency of disturbance caused by the clutch slippage will be appreciably less than the natural frequency of the simple system formed by the axially movable member and the spring which keeps the clutch members engaged. However, it will be understood that the number of rollers and cycles can be varied to suit the particular job requirements and that such variations are within the scope of this invention.

It has been found that in some uses of the clutch 10, there is a tendency for the rollers to creep relative to the maximum torque transmitting position between the driving member and the driven member. This creepage is due to the fact that there must be some permissible error in the machining of the faces of the clutch members, and, therefore, perfectly symmetrical contours are not always produced, and also because experience has shown the deflection in the faces in contact produce an effect that is equivalent to slippage of the rollers relative to the driving member. This creepage is objectionable because it results in a change in the limiting torque or that torque which is the predetermined setting of the clutch.

Therefore, means are provided for maintaining the orientation of the clutch members and the guided roller support in a predetermined relationship. By this means a clutch is provided which will accurately maintain the predetermined torque setting after periods of continuous slipping and after reversible operation of the clutch, preventing creepage from occurring. In the preferred embodiment 10, this means is in the form of an epicyclic gear train connected with the driving member 11 and the driven member 13. A shaft 60 is journaled within a bearing within the cage or roller support 40 and has compound planet gears 61 and 62 fixed on opposite ends thereof. The planet gear 61 meshes with a sun gear 63 formed on the driven member 13 and the planet gear 62 meshes with an internal ring gear 65 formed on the driving member 11. In the particular construction illustrated, the following gear relationships are used:

$$\frac{R_1}{R_2} = \frac{R_3}{R_4}$$

$$R_2 - R_1 = R_4 + R_3$$

where $R_1$=radius of planet gear 62; $R_2$=radius of ring gear 65; $R_3$=radius of planet gear 61; $R_4$=radius of sun gear 63.

*Operation*

In the operation of the illustrated embodiment torque is transmitted from the driving shaft 23, through the spring retainer 21, the spring 30 and the driving member 11, thence through the rollers 15 to the driven member 13. When the torque exceeds the predetermined setting, as for example when the load encounters a mechanical stop, the force of the rollers acting against the face of the driving member 11 exceeds the force applied by the spring 30 and causes axial movement of the driving member in the direction away from the driven member 13 thus permitting the rollers to roll on the countours of the respective clutch members to permit slipping of the clutch. This action may be visualized by reference to the sketches shown in Figs. 4 and 5 wherein the displacement between the face 12 of driving member 11, moving toward the left hand, and the face 14 of the driven member 13 and the rollers 15 is schematically shown.

Figure 4:
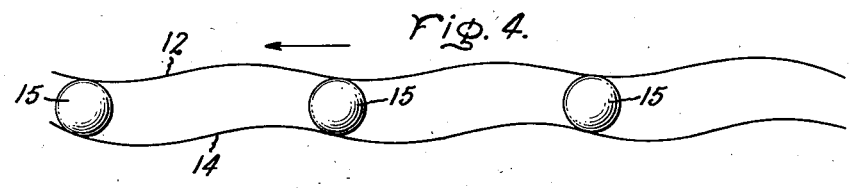
Figs. 4 and 5 are diagrammatic sketches illustrating the relationship between the clutch member faces and the rollers.
Figure 5:
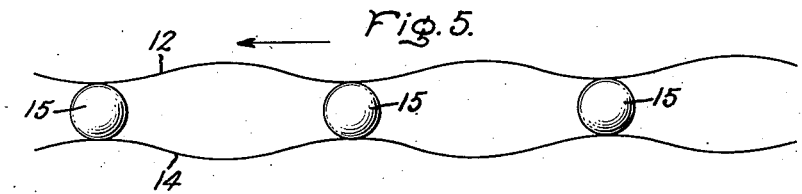

Fig. 4 shows a torque transmitting condition and Fig. 5 shows the slipping condition in which the rollers 15 are rolling over the hills of the clutch face contours. In the Fig. 4 position, it will be noted that the rollers are approximately in the maximum torque transmitting position because they are in contact with the hills at the points of maximum slope. In the relative position of Fig. 5 practically no torque is being transmitted by the clutch, the only torque transmitted being that due to rolling friction. As the face 12 continues to move toward the left in Fig. 5, it will be noted that the rollers will roll toward the valleys of the contours whereby there is a momentary reverse torque transmitted by the clutch due to the potential energy stored in the springs. However as the face 12 continues to move further to the left, the rollers will roll toward the hills of the contours whereby there is a momentary positive torque transmitted by the clutch. The net torque transmitted during the slipping condition then is the sum of the reverse torques and the positive torques, which is of course practically zero.

During the transmission of torque through the guided rollers 15, the driving member 11, the cage 40, the driven member 13, and also the gear train described will rotate as a unit. However, during the slipping condition made possible by the guided rollers as explained heretofore and also by the differential action of the gear train, a predetermined orientation between the driving member 11 and the driven member 13 is maintained, thus eliminating any creepage from the predetermined orientation.

Figure 6:
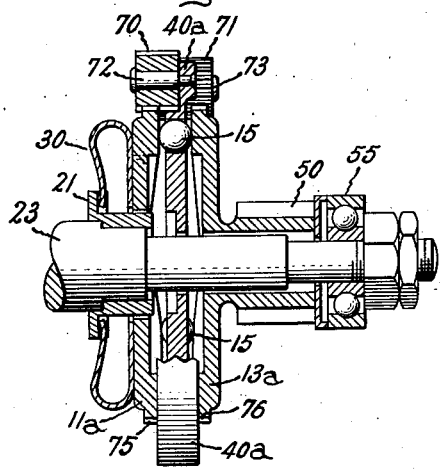
Fig. 6 is a sectional view illustrating another embodiment of the invention.
Figure 7:
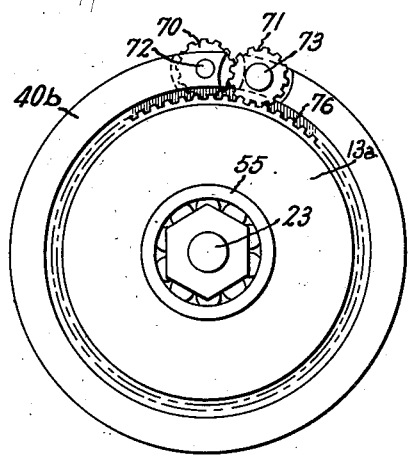
Fig. 7 is a side view of the embodiment shown in Fig. 6.
Figure 8:
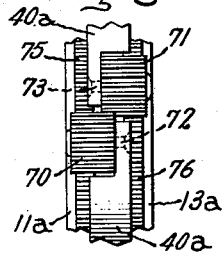
Fig. 8 is a fragmentary top view of the embodiment shown in Fig. 6.

In the embodiments shown in Figs. 6, 7, and 8, the orientation means is in the form of a differential gear arrangement comprising meshing gears 70 and 71 carried by shafts 72 and 73, respectively, each journaled in extended portions of the guided roller supporting cage 40a. The gear 70 meshes in turn with a spur gear 75 formed on the driving member 11a, and the gear 71 meshes with a spur gear 76 formed on the driven member 13a.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and is desired to be secured by Letters Patent of the United States is:

1. A slipping clutch comprising a rotatable driving member having a face with wavelike contours thereon, a rotatable driven member having a face with wavelike contours thereon similar to the contours on the driving member face, a plurality of guided rollers disposed between said faces, one of said members being axially movable in either direction, guide means for maintaining the phase relationship between said rollers the same as that between the peaks of said wave-like contours on said members and means for applying a predetermined force for urging said one member toward the other member to maintain the rollers in contact with said faces.

2. A slipping clutch as set forth in claim 1, said means being adjustable whereby the magnitude of said predetermined force can be varied.

3. A slipping clutch comprising a driving member and a driven member having opposing faces, each of said faces having similar wavelike contours thereon, said members being rotatably mounted and one of the members being axially movable in either direction, a plurality of guided rollers disposed between said members and adapted for riding on said contours, means for applying a predetermined force for urging said axially movable member toward the other member, and means for maintaining the orientation of said driving member, said driven member and said guided rollers in a predetermined relationship.

4. A slipping clutch comprising a driving shaft, a driving member mounted to rotate with said shaft and being axially movable in either direction thereon, said driving member having an annular face with contours thereon of a predetermined wavelike pattern, a driven member rotatably mounted on said shaft and adapted to impart torque to a load, said driven member having an annular face with contours thereon similar to those on the driving member, a rotatable cage supported on the shaft between said members, a plurality of spaced rollars carried and held in spaced relation by the cage and adapted to contact each of said faces, means for applying a predetermined force urging the driving member toward the driven member to maintain the rollers in contact with said faces, and means for maintaining the orientation of said driving member, said driven member and said rotatable cage in a predetermined relationship.

5. A slipping clutch as set forth in claim 4, further comprising stop means associated with the shaft for preventing axial movement of the driven member away from said guided rollers.

6. A slipping clutch as set forth in claim 5, said stop means being adjustable whereby said predetermined force can be varied.

7. A slipping clutch comprising a rotatable driving member having a face with wavelike contours thereon, a rotatable driven member having a face with wavelike contours thereon similar to the contours on the driving member face, a plurality of guided rollers disposed between said faces, one of said members being axially movable in either direction, means for applying a predetermined force for urging said one member toward the other member to maintain the rollers in contact with said faces, and means for maintaining the orientation of the driving member and the driven member and said guided rollers in a predetermined relationship.

8. A slipping clutch as set forth in claim 7, said last-named means comprising a differential gear arrangement connected between the driven and driving members.

9. A slipping clutch as set forth in claim 7 said last-named means comprising an epicyclic gear train connected between the driven and driving members.

10. A slipping clutch as set forth in claim 7, further comprising a cage rotatably supported between said members for carrying said guided rollers, and said orientation maintaining means comprising gearing means connected between said cage and said members.

11. A slipping clutch as set forth in claim 7, said force-applying means being adjustable whereby the magnitude of said predetermined force can be varied.

References Cited in the file of this patent
UNITED STATES PATENTS

| 1,518,634 | Cason | Dec. 9, 1926 |
| 2,301,292 | Frick | Nov. 10, 1942 |